Feb. 4, 1969 P. A. SCHERER 3,425,383
HYDROFOIL METHOD AND APPARATUS
Filed Aug. 11, 1965

INVENTOR
Paul A. Scherer by James C. Wray
ATTORNEY

United States Patent Office 3,425,383
Patented Feb. 4, 1969

3,425,383
HYDROFOIL METHOD AND APPARATUS
Paul A. Scherer, Glenn Dale, Md., assignor to
Paul A. Scherer, as agent
Filed Aug. 11, 1965, Ser. No. 478,971
U.S. Cl. 114—66.5      13 Claims
Int. Cl. B63b 1/20

ABSTRACT OF THE DISCLOSURE

High aspect ratio displacement foils which buoyantly support craft above water, craft having combinations of displacement and dynamic hydrofoils, methods for operating craft with displacement and dynamic hydrofoils, and symmetrical foils and external flaps are described herein.

---

This application broadly concerns displacement hydrofoils. Disclosed herein are novel foil construction and methods of using hydrofoils.

Hydrofoils are becoming increasingly important in water transportation; however, many problems remain. Of great significance are critical speeds at which hydrofoils impart sufficient lift to raise craft from water. Transition from hull to hydrofoils is often difficult. Shallow harbors create special problems in using foils, and known hydrofoils often must be raised in order to facilitate docking.

This invention relates in part to a displacement foil—a foil of such dimensions that a major portion of the load is carried by displacement. Indeed, the displacement of the foil may be greater than the load.

Historically, torpedo-shaped bodies of revolution have been considered to possess best underwater displacement-drag characteristics. Craft have been supported upon submerged torpedo-shaped bodies of revolution, but size of the craft so supported is limited by the large draft requirements of sufficient bodies of revolution.

Ratio of wetted surface to volume of foils of equal chord and equal thickness ratio (thickness ratio is thickness divided by the cord) is substantially the same for a foil of square cross section as for a foil comprising a body of revolution. When a body of revolution is cut longitudinally into two halves, and when the halves are then added at opposite sides of the square cross section foil, a foil results which is substantially better and has greater displacement and less wetter surface than two bodies of revolution of the same thickness. Further advantage is obtained when several central square cross sectional portions are added between opposing halves of the body of revolution; and, the essential rectangular planform hydrofoil is developed. Some harbors are over 30 feet deep, and many more are 7 feet deep at mean low water. When dealing with the hydrofoil, the thickness of the foil is equivalent to the draft of the ship. The water drawn by the craft must be less than the water in the harbor. For a foil of unit span about 70% of the thickness gives the equivalent mean height per unit area of an NACA 66000 series foil section. Below is a table which shows the minimum operating depth, 70% of that thickness, and a buoyant force represented by that displacement. Thus, it is apparent that for particular purposes the rectangular planform has advantages.

| Harbor depth (ft.) | Foil thickness 70% draft (ft.) | Mean displacement/ft.² projected area |
|---|---|---|
| 30 | 21 | 1,344#/ft.² |
| 20 | 14 | 896#/ft.² |
| 7 | 4.9 | 313#/ft.² |

² Projected surface=½ wetted surface.

Any body, such as the hull of a vessel, passing through the surface of water creates a system of diverging waves which result in drag. This drag is a power function of the maximum thickness of the body.

In this invention, the buoyancy of the foil supports the hull through struts. The thickness of the strut is small in comparison with span of the foil. As compared with conventional hulls and catamarans, the narrow strut dimensions of the present invention produce a smaller system of diverging waves, resulting in lower drag.

Proponents of submarine hulls maintain that such diverging wave systems substantially disappear at a submergence of one to one half times the thickness of a body. Other authorities say that this wave making effect persists to approximately the depth of one chord. Of course, somewhere in between lies a point at which wave making effect will add no substantial drag. When foils of the present invention are submerged to depths of the order of the thickness of the displacement foils, the wave making effect is reduced to the extent that the strut-hydrofoil system has little such drag.

Drag caused by end effects of a hydrofoil is decreased with respect to other operating characteristics by increasing span of a hydrofoil. Another method of reducing end effects lies in increasing the chord of the central portion of a foil while reducing the chords of lateral ends of the foil. Systematic outward reduction in chord results in a foil having an approximate elliptical planform which is the preferred embodiment of the displacement foils of this invention.

Straight outward tapering creates delta hydrofoils, of approximate elliptical planform, and offers essentially elliptical distribution of downwash. Delta variations are easier to construct than elliptical hydrofoils, since the latter comprise compound curves, while delta hydrofoils have developable surfaces. Delta hydrofoils disclosed in this invention include foils having V-shaped leading and trailing edges, relatively straight leading or trailing edges combined with V-shaped opposite edges, and rectangular planform medial portions may have sloped lateral ends.

Aspect ratio is defined as the square of the span over the projected area of the foil.

$$\text{Aspect ratio} = \frac{\text{span}^2}{\text{projected area}}$$

Reducing the definition for specific designs, a hydrofoil having rectangular planform may be defined as having an aspect ratio equal to the span over the chord. An elliptical foil's aspect ratio is the ratio of span to pi/4 times the maximum chord, and delta foils have aspect ratios of twice the span to the maximum chord. Throughout this application, high aspect ratio foils are defined as foils having aspect ratios of 1/2 or more.

One advantage of delta hydrofoils is that centers of dynamic pressure and centers of buoyancy for opposite sides of a foil are located close to supporting struts, which are attached to centers of the foils. Centers of buoyancy of opposite sides are located at about 20% of span from centers of the foils. Centers of dynamic pressure of opposite halves of the foil are removed from centers of the foils by about one third of the span. When deeply submerged, the center of dynamic pressure for each foil section occurs on a line connecting quarter chords across the foils. Centers of buoyancy for delta foils are located on a line drawn from about 45% of chord at the center of the foil to tips of the foil.

All foils are pivoted forward centers of lift, and rotational control of the foils is provided by constant lift apparatus disclosed and claimed in Patent 3,141,437, issued July 21, 1965. As a foil approaches the surface, centers of dynamic pressure shift, urging a negative angle of attack on the foil and tending to submerge the foil. As the foil submerges the center of lift shifts in the opposite direction, forcing a more positive angle of attack and raising the foil toward the surface. Inherent stability is gained by the shifting of center of dynamic pressure One object of this invention is the provision of displacement hydrofoils.

A second object of this invention is the provision of high aspect ratio displacement foils.

This invention has as another objective the provision of hydrofoil displacement systems in which span of displacement foils greatly exceeds thickness of supporting struts.

An additional object of this invention is the provision of displacement foils having relatively great span with respect to chord.

Providing foils having planforms of approximate elliptical load distribution is another objective of the invention.

A further object of this invention is the provision of methods of transferring craft from displacement foils to dynamic foils.

One other objective of this invention is the provision of craft which may selectively deploy displacement and dynamic hydrofoils and supporting struts.

Other objectives of the invention will be apparent from the specification and from the drawings in which.

RESEARCH VESSEL

Figure 1:
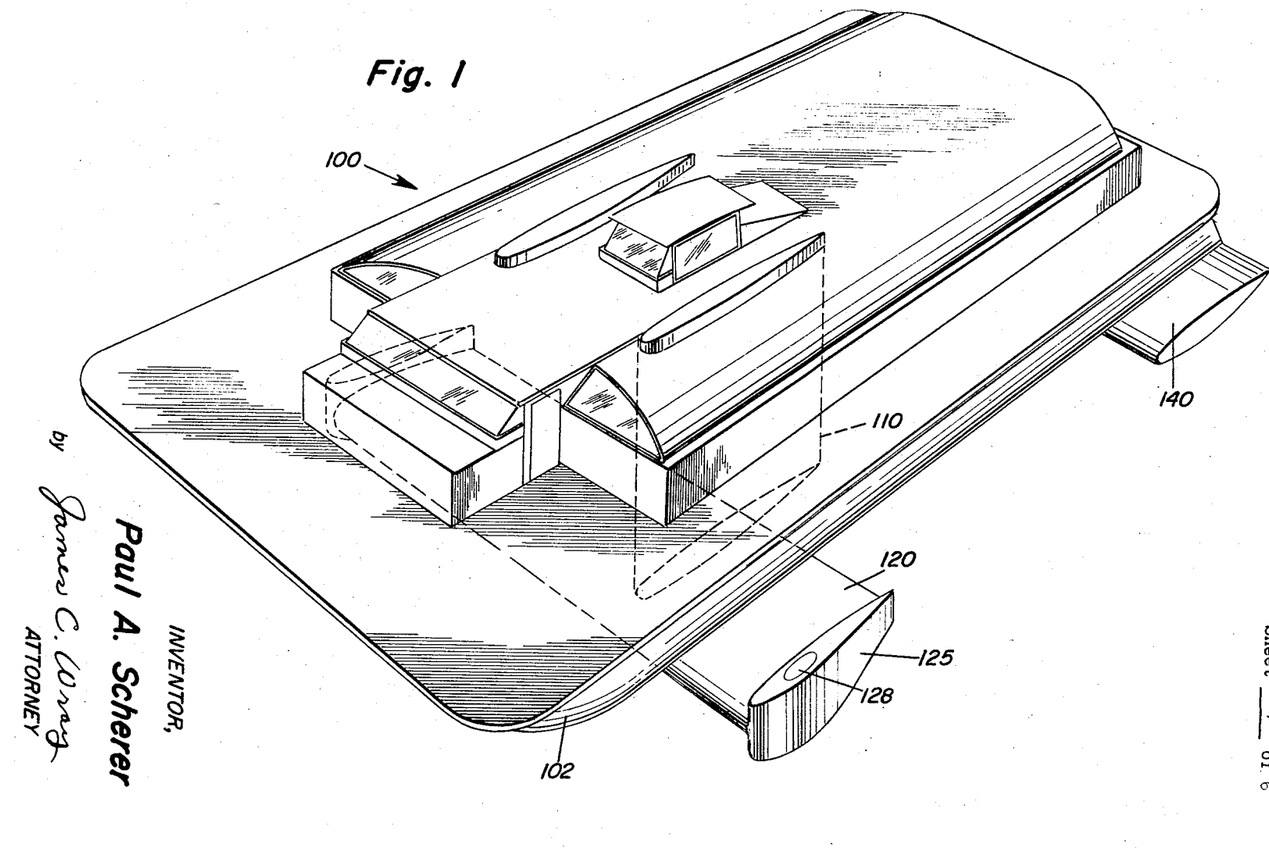
FIGURE 1 is a perspective view of a research vessel having high aspect ratio displacement foils.
Figure 2:
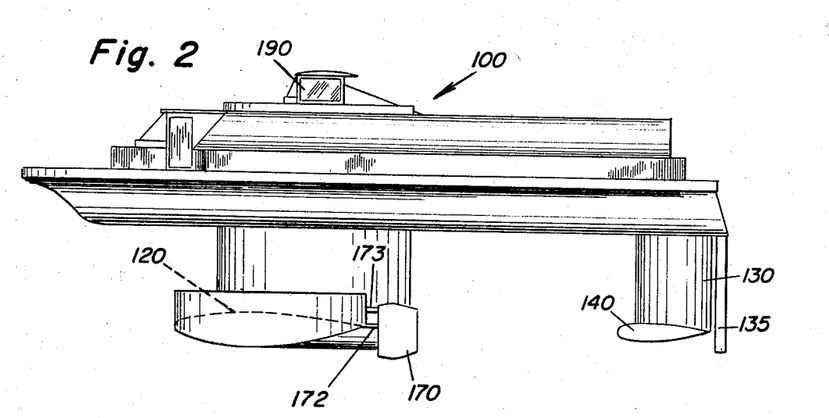
FIGURE 2 is a side elevation of the vessel shown in FIGURE 1.
Figure 3:
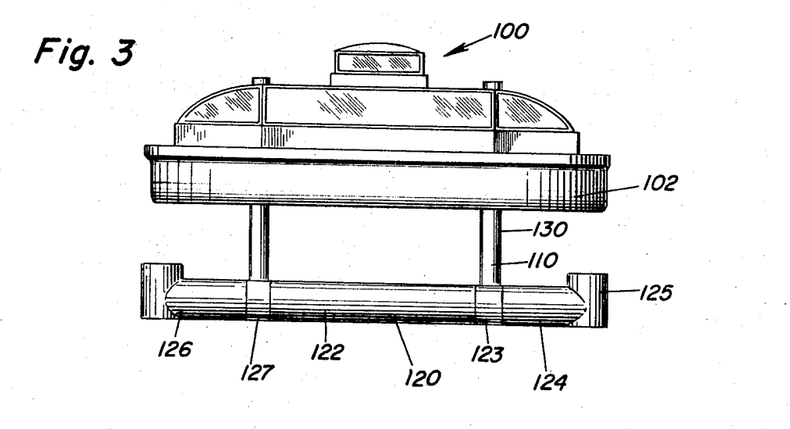
FIGURE 3 is a front elevation of the vessel shown in FIGURE 1.

A research vessel is generally indicated by the numeral 100 as shown in FIGURES 1, 2 and 3. Vertically reciprocal forward struts 110 are pivoted forward centers of dynamic pressure. Forward struts may rotate freely or command moments may be imposed. Located below the bow 102, displacement foil sections 122, 124 and 126 are pivoted forward of their centers of dynamic pressure. After struts 130 are vertically pivoted forward their centers of dynamic pressure; the struts may be controlled to operate as rudders. Foil 140 is pivoted forward its center of dynamic pressure to provide proper trim. The additional displacement of vertical ends 125 at the extremities of the main foil section 120 provide strong righting moments when the craft is stopped. Additionally, the vertical foil shaped elements 125 provide internal access ways 128 to engines within the main foil 120. Tops of vertical ends 125 may be removed for engine maintenance. As shown in FIGURE 2, propeller shrouds 170 enclose propellers which receive power through shafts 172 extending from engines supported in foils 124 and 126. Structural members 173 support the propeller shrouds 170 and propeller shafts 172.

Rigid foil portions 123 and 127 are mounted at the bottom of struts 110. The remainder of foil 120, including medial foil section 122 and outer sections 124 and 126 are controllably rotatable with respect to the fixed foil sections 123 and 127.

The research vessel has the following general characteristics:

| | | |
|---|---|---|
| Length | feet | 90 |
| Beam | do | 60 |
| Draft (slow) | do | 4.0 |
| Draft (cruise) | do | 12.5 |
| Normal displacement | tons | 140 |

For steering when getting underway, external flaps or rudders 135 are extended below the lower surfaces struts 130 and foils 140. When foils 140 and lower portions of struts 130 are submerged, flaps 135, which are spaced from the trailing edges of 130, operate as external flaps. Lateral forces on struts 130 may be magnified by operation of external flaps 135.

The power plant consists of two, optionally four, 300 brake-horsepower, 230 shaft horsepower (200 shaft horsepower at cruising speed) marine diesels. Cruising speed on two engines is 14.4 knots. At 7 knots the total brake horsepower required drops to 100 horsepower. Twenty tons of fuel permits a maximum range of 2000 miles at cruising speed.

Heavily constructed of steel, wood and laminated glass, some 50 tons of payload can be carried. This includes personnel, auxiliaries, fresh water and sanitary systems, winches, hoists, running boats and laboratory equipment. Simple living accommodations provide for 35 to 40 scientists and crew members.

There is wide freedom to arrange the working spaces in whatever fashion adequately serves the use of the vessel as a marine biology laboratory. Major pieces of heavy equipment, holding tanks, fresh water tanks and auxiliaries are concentrated amidships about 35 feet abaft the bow. However, ballast tanks in the foils 120 and 140 provide compensation for freedom of rearrangement. Since fuel, engines, major fresh water supplies and ballast tanks are contained in the main foil 120 virtually the entire area of two decks is available within the main hull 102 1500 square feet, with 6 foot headroom. The lower deck space is divided by structural members and some watertight bulkheads. The main deck has 3480 square feet of enclosed area with open, partially covered, working area associated with dredge operation. There remain 1350 square feet of open deck. The total available area is about 6700 square feet. The main deck has an unobstructed forecastle, 29 feet by 11 feet. At the port and starboard bows there is room for the stowage of two 15′ x 8′ running boats. A secondary control conter-conference room-library-dining room is 16 feet by 28 feet. Behind that is an enclosed space for the general laboratory and galley. The galley is under the wheel house with service to the general laboratory and conference room as well as a dumb-waiter to the wheel house. The enclosed control section is provided with a full width glass windscreen forward, and all thwartships partitions have glass windows and doors, providing adequate light and a sense of spaciousness. The main struts run through the structure and extend above the top-side deck.

A sewage treatment plant is in the after section of the main foil 120 at one of the struts 110 with an access cover through which it is serviced. The main foil 120 terminates in two upturned tips 125 which have substantially horizontal upper surfaces sealed with access plates 128. Feedboard at normal draft permits repair, removal and replacement of the main engines, which are outboard of the main struts 110. Full ventilation is provided for the engine nacelles, but periodic maintenance is limited to times when the vessel is secure in adequate harbor facilities. Control of flow rates, temperatures, and the supply and changing of crankcase oil is accomplished from the control center. With a two or four engine power plant, capable of 8.5 knots on any one engine, it is appropriate to follow aircraft practice and deny other than emergency access to engine nacelles at sea. Carbon dioxide and complete seal-off of each nacelle provides adequate fire protection. However, if a portion of the main foil 120 is desired for visual, photographic, sound or other measurements, access is provided through one of the main struts 110.

Rear foil 140, when the vessel is proceeding at low speed, can be of low background "noise level." It can be constructed of non-magnetic materials. The engines and propeller assemblies are shock mounted in their nacelles in the main foil. All struts are shock mounted in the mail hull. Therefore, little noise or vibration will be telegraphed to the rear foil, and it should provide conditions somewhat comparable to towed bodies of revolution. Limited acces may be had to the rear foil at sea for servicing of instruments.

Wheel house 190 is small but has 360° visibility—for eye and radar. It may be desirable to extend it further aft to give complete visual contact with the winch and dredge area. Aft ballast tanks in the main hull will permit dropping of the rear portion of the main hull buttom to somewhat below water level providing for the handling of heavy loads on the winch cable. At such times access to the foil should be denied.

External flaps 135 control lateral dynamic pressures on after struts 130. The forward foil shaped strut enclosures are also pivoted giving additional control and stability. Selected constant forces are applied through the application of suitable "demand torques" to the vertical foils yielding uniform accelerations even in rough weather.

The main foil sections are pivoted about a horizontal structural tubular member of about 4.2 ft. in diameter. There are three such sections: one center section 122, and two outboard sections 124 and 126. At the bottom of each strut there is a foil intersection body 123 or 127, which is rigidly connected to the structural tubular axis and the main structural struts 110. Each main foil section will be subject to torque resulting from buoyant and dynamic forces.

When underway a given torque applied to a section will cause that section to rotate until the demand torque is balanced by the resulting sum of the dynamic and buoyant torque. When a state of balance is established, the total lift generated by the foil section will remain substantially constant until a new demand torque is fed into the system. Such a system of foils provides great stability for the vessel at sea. By design and appropriate trim through ballast a simple "fail safe" control system is established. Controls of any degree of simplicity or sophistication can be used to supplement the basic system.

It is noted that the dynamic lift of a foil section under constant "demand torque" will remain substantially constant until the demand value is altered. As a foil approaches the surface of the water, the fluid flow pattern is altered with a shift of the center of dynamic lift towards the rear of the foil. If this center of lift is abaft the pivot axis, this will cause the dynamic moment arm to increase with little change in the dynamic lifting force. This will cause the foil to "nose down" reducing the lift and providing a negative change in the supporting force. If the foil drops below the operating submergence level established by the demand torque, the center of dynamic lift will shift forward reducing the moment arm at which the dynamic force is applied; and the section will "nose up," increasing the dynamic lift. Thus a submerged foil system wherein the chord length is substantial relative to the design submergence may be designed for inherent stability in the seaway for which the craft is designed.

Traveling above the surface of the water as a platform, the research vessel is designed for good stability in a four foot seaway. When lowered so that its hull rests on the surface, the vessel is a good sea-boat for heavy weather.

The rear foil is adjustable as to angle of attack; this angle normally is set to conform to the trim and is left undisturbed until a change is desired. If precision control of platform stability is later found to be of merit, a more sophisticated rear foil assembly could be fitted.

In getting underway at design displacement, foil upper surfaces, initially above the water surface, will become "wetted" surfaces. At about 7 knots, there will be sufficient dynamic negative lift available to submerge the foil to cruising depth. For full dynamic control at lower speeds, ballast will be accepted in the foil system. All such ballast is arranged for "blow down" with low pressure compressed air continuously available.

Auxiliary equipment includes adequate diesel electric generators, low pressure evaporators for fresh water make-up at sea, electro-static precipitators for all induction and ventilating air, heating and cooling by reversed cycle heat pumps. A fire protection system includes high pressure water pumps and incorporates under water jets for auxiliary flexibility of maneuver alongside or at moorings. As previously mentioned, there is a complete sewage treatment plant installed, serviced from outside the mail hull. The main power plant is 125 volt AC, but DC service is also supplied. Compressed air, distilled water, fresh and sea water of controlled temperatures are to be available in all laboratory spaces, including holding tanks and aquaria. All navigation aids will be installed, including ship to short communication equipment. In addition to the two running-work boats, there is an adequate number of Carle floats distributed at appropriate points.

The vessel is designed for great endurance in off-shore operation—whether foil borne or partially supported on the main hull.

RUNABOUT

Figure 4:
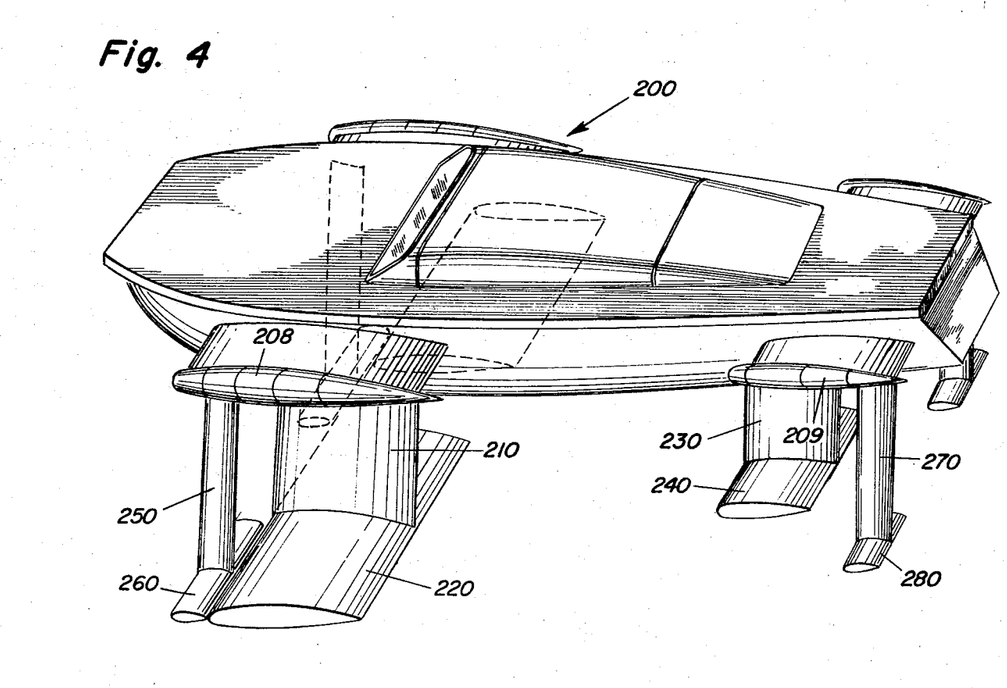
FIGURE 4 is a perspective of a runabout craft having high aspect ratio displacement foils and dynamic foils.
Figure 5:
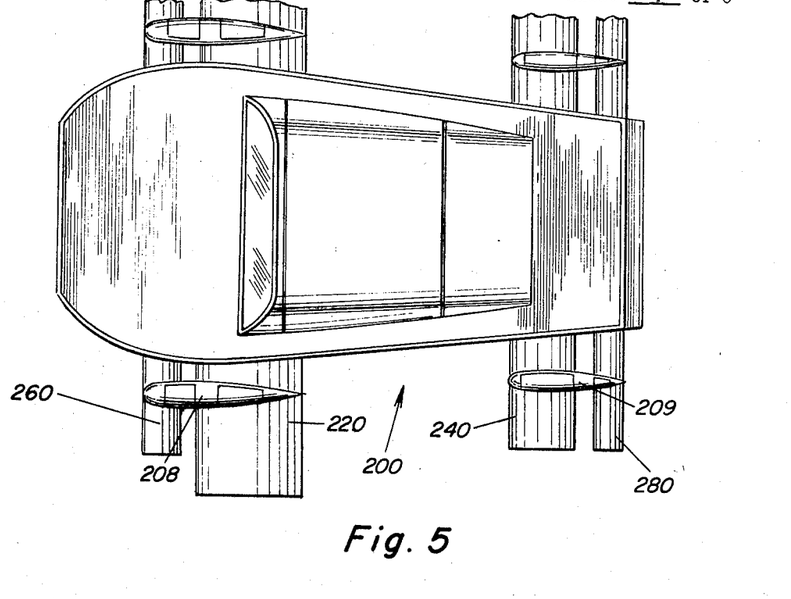
FIGURE 5 is a plan view of the craft shown in FIGURE 4.
Figure 6:
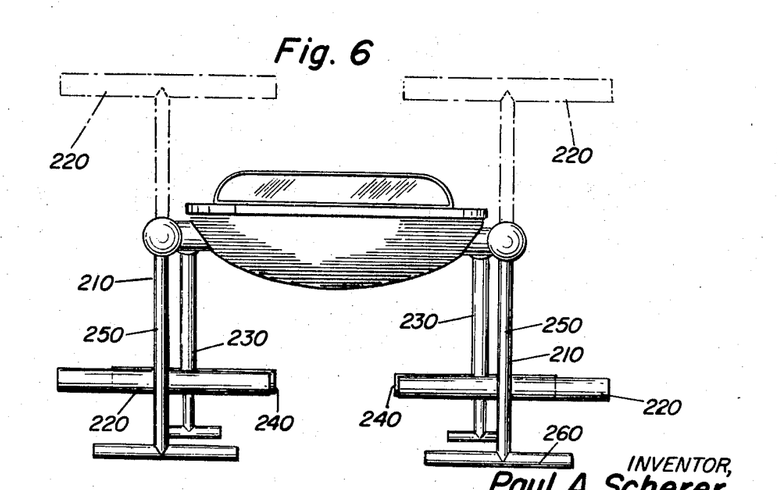
FIGURE 6 is a front elevation of the craft shown in FIGURE 4, illustrating raised positions of hydrofoils in phantom lines.

FIGURES 4 and 5 illustrate runabout 200, which is supported above high aspect ratio displacement foils 220 and 240 and dynamic foils 260 and 280, by struts 210, 230, 250 and 270. At rest, displacement foils 220 and 240 are awash; dynamic foils 260 and 280 and struts 250 and 270 may be lifted from the water to provide minimum draft. Under way, the craft may be supported by submerged displacement foils 220 and 240, until such a speed that the craft may be supported on dynamic foils 260 and 280. At such a speed, displacement foils 220 and 240 may be rotated from the water to provide minimum drag. All of the struts are rotatable laterally about bodies of revolution 208 and 209, which are mounted on sides of the craft. Struts and foils are pivoted forward of centers of dynamic pressure. Command torques may be applied to provide a given lift regardless of speed. Forward struts 210 and 250 may weathervane, while after struts 230 and 270 are controlled to operate as rudders. Struts may be rotated outwardly at any angle to operate the foils as dihedral foils.

The craft may rest upon its hull, and all of the foils may be rotated from the water for cleaning and storage. Struts and foils may be rotated in in-board to provide clearance in narrow slips.

SAILING CRAFT

Classical limitations are imposed on speed capabilities of sailing vessels. Hull speed is the speed at which the drag of a conventional hull rapidly increases with small increases in speed obtained at the cost of a large increase in thrust. In many modern sailboats this has been countered with the planing hull, which is fast on off-wind courses in brisk winds. In recent years hydrofoil sailboats have won attention. Generally these are fitted with surface piercing dihedral foils. At low speeds before hulls are foilborne, drag is high; it takes a strong wind to raise the vessel on foils. When a craft is on surface piercing dihedral foils, drag may be two and one-half to three times the drag of the same craft on a submerged foil system. Such systems enable a boat to point high and sail fast on the wind or close hauled.

A displacement foil is defined as one which carries major loads by buoyant forces. When underway, displacement foils may use dynamic lift of positive or negative sign for control and for carriage of additional loading. Since the design calls for the use of fully submerged foils, the rich data of aeronautics may be used as modified by the water surface effects, now well understood from tank tests. The craft is designed for two major regimes, full displacement and all dynamic, although these may be combined under special conditions.

Figures 7, 8, 9:
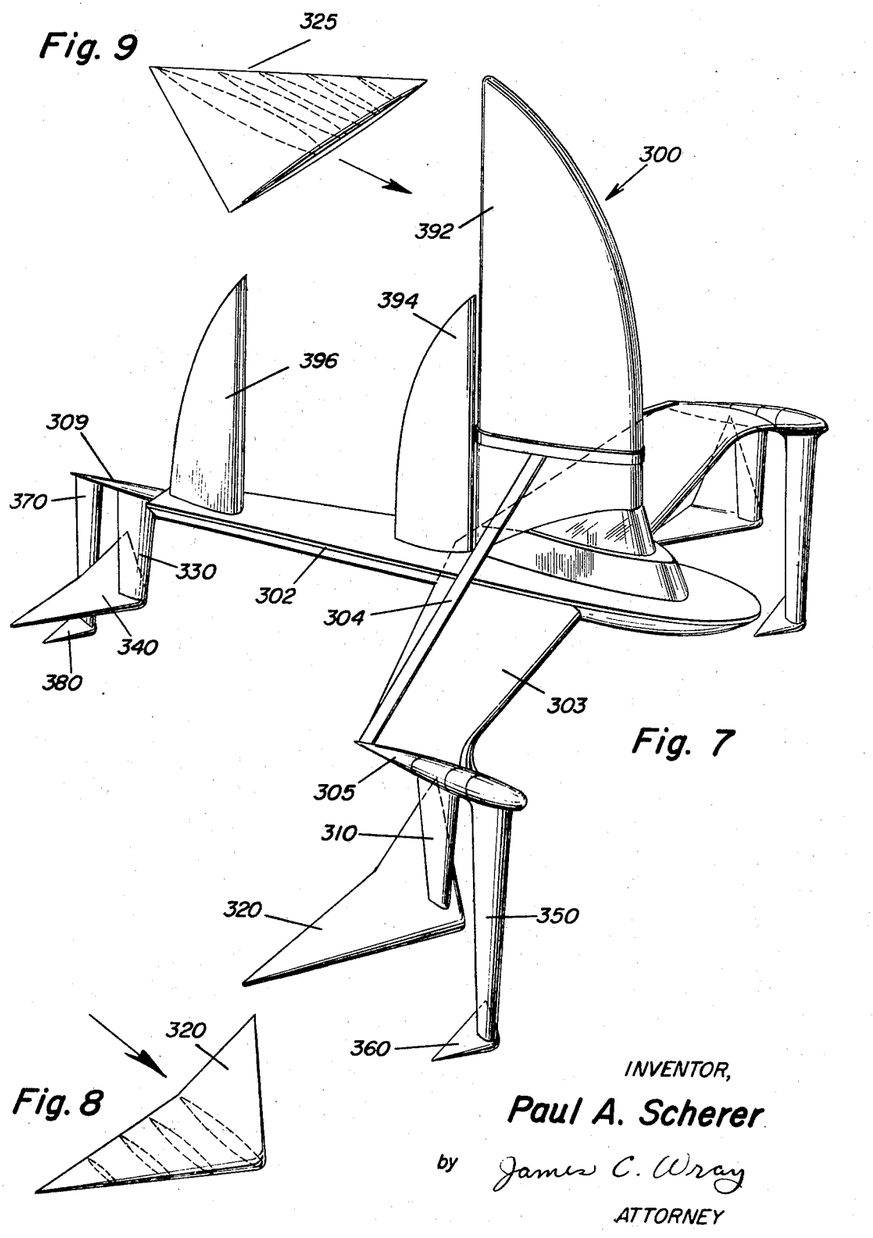
FIGURE 7 is a perspective view of a sailing craft having displacement and dynamic foils of delta configuration.
FIGURE 8 is a detail of delta foils shown in FIGURE 9.
FIGURE 9 is an alternative form of delta foils.
Figure 10:
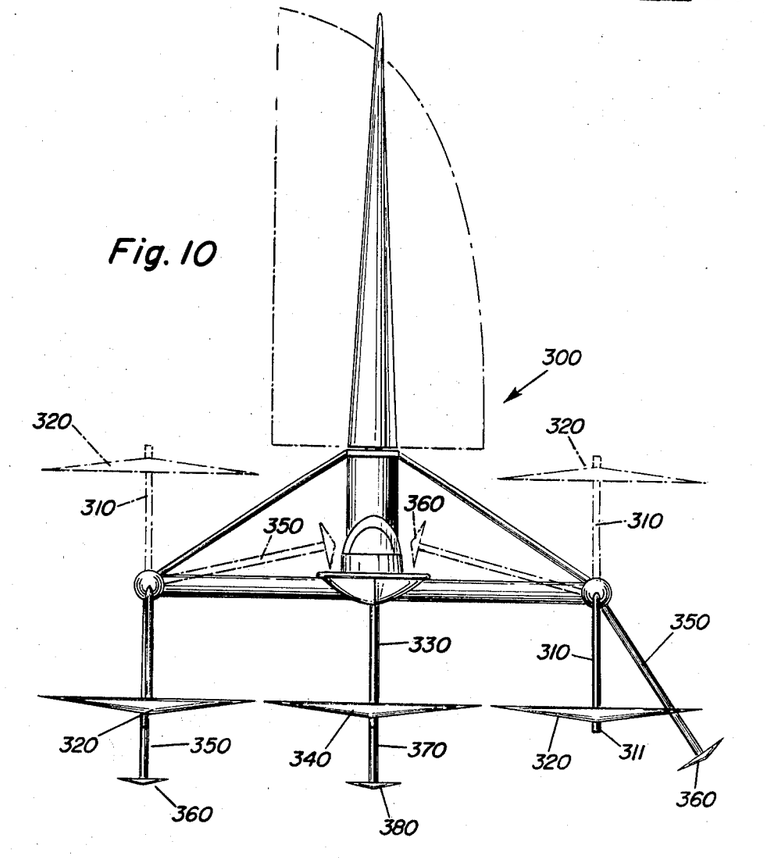
FIGURE 10 is a front elevation of the craft shown in FIGURE 7, illustrating selected operating positions of foils, and showing stowed positions in phantom lines.
Figure 11:
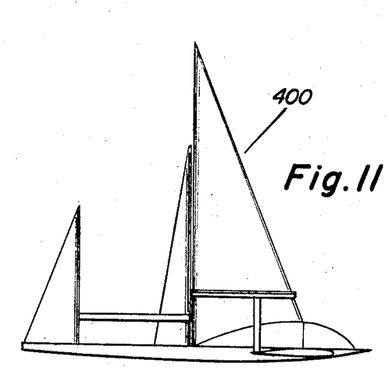
FIGURE 11 is a side elevation of an alternative sailing vessel embodiment.

A sailing vessel is generally indicated by the numeral 300 in FIGURES 7 and 10. Hull 302 and wings 303 support bodies of revolution 305. High aspect ratio delta displacement foils 320 are suspended from struts 310, and high ratio dynamic foils 360 are suspended from struts 350. Two rotatable bodies 309 on a common axis at the stern of the craft support struts 330 and 370, which engage displacement foil 340 and dynamic foil 380. The crew or ballast may be shifted toward the windward along the athwartships member 303, to balance the overturning moment created by the force on the sail. Generally this moment is compensated by carrying negative lift on the windward hydrofoils and positive lift on the lee and after hydrofoils. Displacement foils and struts are preferably stowed vertically, while dynamic foils and struts are rotated inwardly for cleaning and storage as shown in phantom lines in FIGURE 10.

As shown in FIGURE 10, forward struts 310 and 350 may be angularly oriented to increase righting forces and to add lee forces opposed to lateral wind loading of the craft. Preferably forward struts are rotated 45° outwardly. Since the struts are approximately six feet long, moment arms of the forward foils are increased by 6 sin 45° or 4.25'. Leeward foils have positive angles of attack; windward foils have negative attack angles. The struts are trimmed in desired position, with small excursion controlled by deflection of the strut.

Mainsail 392 is pivoted above its pedestal, forward of its center of dynamic pressure, and said 394 is pivoted forward of its leading edge to act as an external or split flap with a deflection of ±35 degrees from amidships. The flap has an area equal to about 20% of mainsail 392. After sail 396 is pivoted forward its center of dynamic pressure. Demand torques are selectively applied to all sails in a continually variable or limiting way. External or split flaps may be added to all foil sections to greatly increase lift. Flap 394 augments the lift of sail 392 so that the said system produces lift coefficients of the same general value as canvas.

FIGURE 8 is a detail of the displacement and dynamic foils shown in FIGURE 7. The delta foil shown in FIGURE 8 has a V-shaped leading edge and a relatively straight trailing edge. The trailing edge is somewhat depressed medially due to raised lateral portions of the foil. Dotted lines within the foil reveal relative thickness of random sections.

FIGURE 9 illustrates a modification 325 of a delta foil, in which the leading edge is relatively straight and the trailing edge comprises a V-shaped line. Alternatively, delta foils may have both V-shaped leading and trailing edges. In the latter form the forward edge preferably defines an apex having a greater angle than the apex of the trailing edge. The pivot line of the latter foil may be determined by drawing a line across the maximum span of the foil.

The foil systems of the sailing craft comprise coupled dynamic and displacement foils. While craft 300 rests on hull 302, wings 303 stabilize the boat, and displacement foils and dynamic foils may be raised for maintenance and cleaning at the positions shown in lines on FIGURE 9. After moving the hull into sufficiently deep water upon displacement foils, dynamic foils are lowered into the water. As speed of the craft increases above 12 knots, displacement foils may be winched from the water, and craft will fly upon dynamic foils.

On displacement foils in a twelve knot wind, the craft will make good 8 knots into the wind, about 6 knots downwind and over 12 knots on a broad reach. In a wind of 20 knots these figures rise to 13.5 knots made good into the wind, 10 knots downwind, and a top speed of 21 knots. If dynamic foils are fitted, the twelve knot speed is adequate for transition from displacement and with the wind holding at 12 knots the speeds increase to 14 knots, 10 knots and 26 knots, respectively.

DIMENSIONS AND GENERAL CONFIGURATION

The central section or hull 302 of sailing craft 300 is about 34.5 feet overall. There are two bodies of revolution, 305, on the wing-tips. The center lines of these torpedo shapes are separated by 15 feet. The maximum diameter of the bodies of revolution is 2 feet, the craft giving a maximum beam of 17 feet when all foils are housed. Three displacement foils 320 and 340 have delta planform. Each of the two forward displacement foils 320 displaces slightly over 200 pounds. Struts 310 are 4.5 feet long from the central hinge axes of body of revolution 305, to centers of foils 320 which have maximum chords of 2.8 feet and spans of 8.4 feet. Rear displacement foil 340 has corresponding dimensions of 2.2 and 6.8 feet, respectively, and displaces 335 pounds. All are NACA 64–021 foil sections.

Forward dynamic foils 360 have chords of .81 foot and spans of 2.45 feet, while rear dynamic foil 380 has a chord of .58 foot and a span of 1.73 feet. Dynamic foils 360 and 380 are carried on struts 350 and 370, 60 feet in length. All are NACA 66–012 sections. All foils may be withdrawn from the water and housed topside. When secured on a mooring, the forward foils will rotate about axes of bodies of revolution 305. Dynamic foil tips will rest on the hull, and displacement foil tips will rest on wings 303. When the craft is sailing on dynamic foils the displacement foil struts will be vertical with the delta foils on top. Rear foils rotate independently, about a central fore-and-aft axis, and withdrawn struts will be carried vertically, foils on top. Any foil may be rotated from the water without interfering with any other.

When a hydrofoil is pivoted forward of its center of dynamic pressure, and when a suitable constant torque is applied to the foil, it will assume a position such that the moment created by the lifting force on the foil multiplied by the effective moment arm of the lifting force balances the command torque. The foil, as a set of scales, will maintain constant lift changing its angle of attack to accommodate wave motion and speed. There are small departures from precisely constant lift due to inertia, but these variations are not of first order importance in operation of the craft.

Sails or airfoils 392, 394 and 396 are NACA 64–021 wing sections. Since airfoil 392 with its pedestal and sail 394 operate as a unit, there are two sails, the mainsail and the jigger. The mainsail is made up of three parts: (1) a pivotal portion of airfoil 392, which turns about a vertical axis forward of its aerodynamic center of lift, (2) the fixed pedestal portion of airfoil 392, which is integral with the hull, and which extends upwards from the deck 4.0 feet, and (3) airfoil 394, hereafter called the external flap, which is pivoted about an amidships vertical axis four inches forward and of the trailing edge of the pedestal. (The hinge parts are not shown.) The external flap 394 may be deflected 35° on either side of the center—or lubber-line—of the hull. Sections 392 and 394 can be made the effective equivalent of a highly cambered section by the deflection of 394 relative to 392. Thus high lift coefficients may be realized, which are not only comparable to the lift coefficients of canvas sails but also in excess of the optimum left coefficient when making good maximum speed into the wind. The jigger 396 is pivoted about a vertical amidships axis forward of its center of lift. The pivoted airfoil section 392 including its pedestal has a root chord of 7.5 feet and a height of 18.5 feet with a projected area of 110.6 square feet. The external flap 394 and the jigger 396 have similar dimensions; root chords are 3.5 feet, heights are 10.5, and projected area is 30.96 square feet each. Total sail area is slightly less than 175 square feet. The distance between the trailing edge of the external flap 394 and the leading edge of the jigger is about 5.8 feet.

It is apparent that the sail system projected upon a vertical plane parallel to the center-line of the hull gives much the appearance of one half of a horizontal projection of a light monoplane with main wing and elevator, and it is designed to have satisfactory static and dynamic stability about its center of dynamic pressure resulting from the flow of the apparent wind.

The principle of constant lift may be applied to the sail system as well as to the hydrofoil and strut system. There are many ways of applying or imposing a command torque: electrical, pneumatic, hydraulical and mechanical. Although a vacuum system has many advantages, a mechanical means will be presented, in keeping with the tradition of "sheet and boom."

A sheet is attached to the foot of the pivoted section of sail 392, near its trailing edge. The sheet is led through the pedestal over suitable guides, and it is carried forward and attached to one end of a long spring of such type that a considerable extension of the spring under design loading is associated with only a small change in tension. Similar sheets and springs are connected to the jigger and to the external flap. A line, or sheet extension, is secured to the other end of each spring and is led to the control center. There, the line may be wound over one of several drums mounted on a common axis with a control wheel. Each drum is connected to the axis by a clutch, which, to insure full safety, is free to slip at some selected maximum force. A wheel may be held in any position by a ratchet or dog, or as in the conventional sailboat, may be manually held by the helmsman so that he may feel the action of the wind on the airfoils. Such a simple device with the use of varying diameters will maintain an approximately constant command torque on all airfoils (as well as hydrofoils, struts and rudder) and thus produce a constant force on the airfoil system and foils proportional to the command torque. As will be touched upon later the apparent wind is normally less than 10 degrees from amidships, and the system is nearly linear in its geometry. The important point is that the forces on the airfoils and hydrofoils and the overturning moments thus applied to the craft will be nearly constant, and limited as to maximum value, as long as the helmsman holds a constant command torque on the system. When cruising all foils may be so operated with independent springs and trimming devices, and all sheet-extensions may be led to a common control, which subjects the several sheets to proportional increase or decrease as a single operation. Further, lines secondary or supplemental may be attached to the individual sheets described between their springs and the unit which each controls and run to the cockpit in loops so that each control unit may be manually overriden without change of the basic setting. Such supplemental lines may be run to a separate "wheel" and post controlling "climb" and "roll" and may be run to "rudder" pedals controlling the "course."

When a foil is moving below the free surface of the water, and when the depth of submergence is about equal to its effective chord length, the center of dynamic pressure will be somewhat abaft the ¼ chord position. When the submergence is just equal to the effective length of the chord, the center of dynamic pressure may be about 33% of chord. When at ¼ chord submergence the center of dynamic pressure will have shifted aft to about 54% of chord. If the foil is pivoted at 25% of its effective chord, the moment arm of the center of dynamic pressure will have shifted and increased by more than a factor of four. If a suitable and constant command torque is imposed on such a foil, it will rotate until the moment created by the lifting force on the foil, and its moment arm balances the command torque. Therefore, and due to the foil's nearness to the surface, the foil will choose the particular depth of operation required by the command torque and the load which the foil is carrying dynamically. When the loading on a foil is increased with no change in the command torque, the loaded foil (the leeward hydrofoil) will nose down and it will develop a downward component of velocity. As the foil reaches greater depths, the moment arm decreases, and the foil will turn toward the surface. When the load on a (windward) foil is decreased, the opposite effect will occur, which will cause the foil to seek greater depth. Increasing the command torque will bring it closer to the surface, decreasing the torque will cause it to seek and run at a greater depth, and this action will be independent of the speed of the craft or wave motion. In this fashion a submerged foil is given great stability and will accommodate large changes in load, say four to one, with a moderate change in depth.

SAILING CRAFT OPERATION

When moored the craft may be floating on the wing-tip bodies of revolution 305 and the after section of hull 302. In this position it will ride with a draft of one foot and will have great stability since the wings 303 are just at the surface. When anchoring in heavy weather, it may be best to ride on the displacement foils 320 and 340 with hull and wings well above the water. At her moorings, with sheets unbent, the external flap 394 is unstepped so that all sails may rotate without interference. The airfoils are free to weathervane and the craft can ride through severe blows; a sixty knot wind will cause a drag on the main of about 12 pounds.

One method of getting underway is outlined; many others suggest themselves. The displacement foils are rotated down with the struts vertical and the displacement hydrofoils are trimmed about their horizontal axes to balance the moment of buoyancy. Each forward displacement foil has a short extension of its strut below the bottom of the foil. The rudder (the extension of the rear displacement strut) is free to weathervane with its strut. The leading edges of all foils are below mean water level. The mooring line is led back from the bow along one side of the hull. The sheet on the external flap is free, and the sheet on the jigger is freed. The pivoted portion of airfoil 392 is sheeted amidships.

The hull will fall off the wind on the side opposite the mooring line. The mooring line is cast off, and the rudder, rear strut and foil assembly are gradually brought to an angle tending to hold the craft off the wind. At moderate speed, the flow over the hydrofoils is established, and the hydrofoils are trimmed for moderate submergence. The forward struts are given moderate torque to hold the course on the wind, and to permit the hull to hold its centerline within 10 degrees off the apparent wind. Differential lifting moments are placed on all hydrofoils to balance overturning moment. A torque is applied to move external flap 394 30° from the centerline of the hull. The torque is applied so that the trailing edge of external flap 394 moves into the wind. The sheet is trimmed on the jigger 396 to bring it to about 7 degrees angle with the hull's centerline, and the rudder and jigger are trimmed to hold a course about 23 degrees off the apparent wind. It is noted that this handling is proposed for getting up on dynamic foils at an early time, such as in a race, when the true wind is somewhat above 12 knots.

The craft may be handled much like a conventional sailboat. The forward struts 310 and 350 replace the dagger centerboard; the rear strut 330 and its extension operates as a rudder. The sail system is almost conventional in function. On displacement foils alone the craft is fast and competitive with catamarans.

If transition to dynamic foils is desired, it may be accomplished one foil at a time. As twelve knot speed is approached, the rear dynamic foil 380 may be rotated into the water and may be trimmed to unload the displacement foil. Displacement foil 340 is rotated out of the water, so that its strut 330 is again vertical and is roughly parallel with the chord of the jigger 396. As speed increases the load on the forward windward foil drops to neutral, and negative angle of attack produced by appropriate command torque balances the buoyant force. The windward dynamic foil 360 now replaces the windward displacement foil 320. With two (after and windward) dynamic foils functioning there will be a further increase in speed. After the craft is stabilized, the substitution of the lee dynamic foil is made. Upon their introduction torque upon the hydrofoil and strut may be set at no dynamic lift or force. Torque on the leeward dynamic foil 360 and its strut 350 may be applied gradually as torque is removed from the displacement foil 320 and strut 310. After this is accomplished the dynamic hydrofoil is given a torque to pick up the full load at the same time that the displacement foil is unloaded; whereupon the latter is rotated to its vertical position.

At very high speeds the struts of the dynamic foils may be rotated laterally outwardly, as shown on the port side of the craft of FIGURE 10 until the hydrofoils are caring for the overturning forces, the gravity loads and the lee forces. This leaves all struts in either pure compression or pure tension, with no tortional loading. In a similar fashion, the displacement struts can be used at various divergent angles from the vertical and function in some respects in a manner equivalent to adjustable surface piercing foils.

For greater freedom of action, a retractable dagger board may be housed in the pedestal forward of a vertical plane, passing through the resultant force vector of the sail system. The dagger as all struts would be free to rotate or would be trimmed as to angle of attack, or an appropriate torque could be applied. Since the sheets are each spring loaded, they can be "cleated" with safety, particularly provided a single release may be incorporated to release all sheets. Where the word "trim" has been used it applies to either a fixed setting or an appropriate torque. A properly trimmed craft should hold a steady course off the apparent wind. As previously mentioned, if constant torques are not used, there needs to be an interacting system for controlling: tension on the sail sheets, angle of attack on the foils for balancing overturning moment, and angular disposition of the forward struts for balancing lee forces. This is a conventional problem which has been ingeniously solved for many sailboats.

When sailing a conventional sailboat, skippers desire a slight weather helm. The conventional craft is designed such that, when the rudder is amidships, the center of dynamic pressure of the water system is ahead of the center of dynamic pressure of the air system. Before the craft will sail efficiently on a desired course, another force must be added to the water system so the centers of dynamic pressure will be on the same vertical line for both the air and water system. This additional force may be supplied by the rudder, and to move the center of dynamic pressure of the water system aft to coincide with the center of dynamic pressure of the air system, a weather helm is held on all courses except when running before the wind.

This invention has a similar concept; a vector of resultant hydraulic pressure must lie in a vertical plane intersecting the center of dynamic pressure of the air system, to hold a steady course. To maintain stability of course, with this invention the center of dynamic pressure of either system can be moved. The center of dynamic pressure of the air system is changed by movement of the jigger 396. Trim can be achieved through shifting the center of dynamic pressure of the water system, by rudder control with the after struts or by changing angle of deployment of forward struts.

When on mooring the external flap 394 may be unstepped and mounted on a vertical axis between the trailing edge of the pedestal and the leading edge of the jigger 396. Normally, the jigger will be secured amidships while the other two pivoted sections will be free to weathervane. Even in heavy blows the drag on the freely rotating sails will be small.

There is a central control cockpit incorporated within the pedestal and enclosed by a lucite bubble screen and a laminated glass base. The screen and base may be slid forward in tracks on the bow for access, or to permit the pilot to stand in fog or other condition when the best visibility and hearing are desirable. With moderate movement the pilot in the cockpit may command a view of the entire horizon. Because of its aerodynamic shape the bubble screen adds little drag. It may be incorporated wholly within the pedestal to eliminate possibilities of drag.

In addition to the usual modern navigational aids, the pilot will have available in the cockpit: indication of course steered relative to the lubber-line, indication of speed through the water, a compass whose lubber-line holds parallel to the course, indication of the angle and speed of the apparent wind relative to the water line and indication of the angles of attack of sails and foils, including dagger and rudder. Tables and charts are in preparation which will permit rapid determination of the velocity of the true wind, estimation of the best course to steer for the shortest elapsed time for a given leg and optimum placement of ballast.

Unladen weight of the craft is 300 pounds; gross displacement of the three displacement foils is 500 pounds. Weights are based on laminated glass cloth and epoxy resin construction, with possible use of steel, monel or aluminum in structural members of high stress where deflection should be limited.

The speed of the craft will be twelve knots or higher. If not already in flight position for auxiliary control purposes, dynamic foils 360 and 380 are rotated and secured in the down position. Parenthetically, the transition may be made step by step, by foil pairs. For example, winch the displacement foils through a rotation of 180 degrees, where the strut housing, which is foil shaped, will act as a minor but material contribution to sail area. Note, however, that these struts partially obscure vision from a seated position in the central cockpit. However, there may be one or more crew members. Further, it is contemplated that there will be auxiliary control centers near the wing-tips and, in event of solo operation the pilot may stand there from time to time. Certainly the crew should be to windward when the craft is at speed, and the shift of "ballast" reduces dynamic drag on the foil system. The change of foils in the forward windward position can be made with profit before twelve knots. Further, in heavy wind and sea, even although racing, it may present advantages to remain on displacement foils which can then operate up to 30 knots.

While there are many ways in which optimum performance may be achieved, and due to excess buoyancy in the displacement foils, the craft may always be operated in the same fashion as a conventional sailboat, however with greater stability and improved performance. In fact, this will be a good manner in which to become familiar with the operation and gain the necessary confidence. Also, at any time, if the sheets are allowed to run, she will head up into the wind and lie quietly until further commands are given. This craft is able to take heavy off-shore weather long after small craft warnings have been posted. It is worthy of mention that, on dynamic foils in a twenty knot wind with seas of 2.5 to 3 feet, the craft will point high, 20 degrees off the apparent wind, make about 30 knots through the water and make good more than 20 knots to windward. She will make good 17 knots downwind, and on a reach do about 40 knots.

Although this invention has been disclosed by specific embodiments, other applications will be obvious to those skilled in the art. Limits of the invention are precisely described only in the appended claims.

I claim:
1. Water craft comprising at least one generally horizontally oriented, submergible, high aspect ratio displacement hydrofoil capable of buoyantly supporting weight substantially greater than its own.
2. The craft of claim 1 wherein said at least one hydrofoil comprises a leading edge, a trailing edge, a generally continuous foil surface interconnecting the leading and trailing edges, one of the edges being V-shaped and defining an outward apex, and the other of the edges being substantially straight.
3. The craft of claim 2 wherein said hydrofoil comprises a V-shaped leading edge having forward apex and a relaitvely straight trailing edge.
4. The craft of claim 3 wherein said trailing edge inclines outwardly from a central point on said edge.
5. The craft of claim 2 wherein said hydrofoil comprises a V-shaped trailing edge having after apex and a relatively straight leading edge.
6. In a craft, hydrofoil apparatus comprising:
at least one displacement hydrofoil;
at least one first strut interposed between said displacement hydrofoil and said craft, said displacement foil maintaining said craft above the water;
at least one dynamic hydrofoil;
at least one second strut interposed between said at least one dynamic hydrofoil and said craft; and
means for raising said at least one displacement hydrofoil out of the water.
7. Apparatus of claim 6 further comprising at least one body of revolution mounted on said craft; said at least one body of revolution having axis aligned fore and aft on the craft, and having two separately rotatable sections, one of said sections being fixed to said at first strut, the other of said sections being fixed to said second strut; and means selectively rotating said sections.
8. A method of using hydrofoils comprising;
cruising upon at least one submerged displacement foil and at least one submerged dynamic foil;
attaining dynamic foil supporting speed; and
raising said at least one displacement foil above water.
9. A method of proceeding on a hydrofoil comprising:
getting underway;
submerging displacement foils;
lowering dynamic foils when in sufficiently deep water;
cruising at dynamic foil supporting speed; and
raising displacement foils from the water while underway.
10. Hydrofoil craft apparatus comprising:
a hull,
at least one submerged high aspect ratio displacement hydrofoil,
at least one submerged dynamic hydrofoil, and
struts interconnecting the hydrofoils with the hull.
11. The hydrofoil craft apparatus of claim 10 wherein at least one dynamic hydrofoil and at least one strut attached to the at least one dynamic hydrofoil are disposed outwardly with respect to the hydrofoil craft.
12. The hydrofoil craft apparatus of claim 10 wherein at least one displacement hydrofoil and its attached strut are disposed generally vertically downward from the carft, and wherein at least one dynamic hydrofoil and its attached strut are disposed angularly with respect to a vertical line through the craft, at least one dynamic hydrofoil being disposed generally outward from at least one displacement hydrofoil.
13. The apparatus of claim 10 wherein at least one displacement foil is out of the water.

References Cited

UNITED STATES PATENTS

| | | | |
|---|---|---|---|
| 2,795,202 | 6/1957 | Hook | 114—66.5 |
| 3,094,961 | 6/1963 | Smith | 114—66.5 |
| 3,183,871 | 5/1965 | Reder | 114—66.5 |
| 3,085,537 | 4/1963 | Headrick et al. | 114—66.5 |
| 3,221,698 | 12/1965 | Turner | 114—66.5 |
| 3,347,197 | 10/1967 | Scherer | 114—66.5 |

OTHER REFERENCES

Interavia, vol. XVII, No. 10, October 1963, pp. 1563–1565.

ANDREW H. FARRELL, *Primary Examiner.*